Feb. 8, 1966     R. NEUSCHOTZ     3,233,645
SELF-ALIGNING INSERTS
Original Filed April 14, 1959
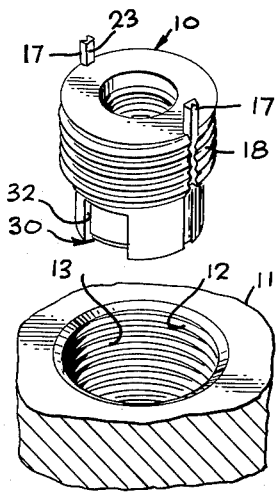
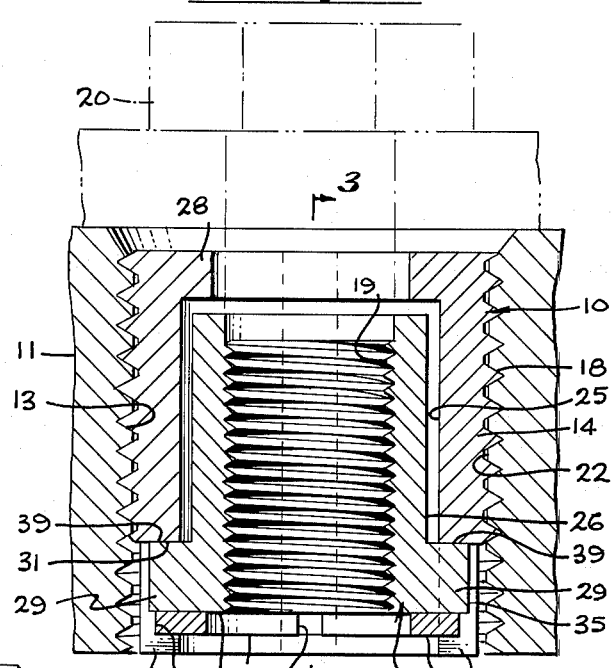
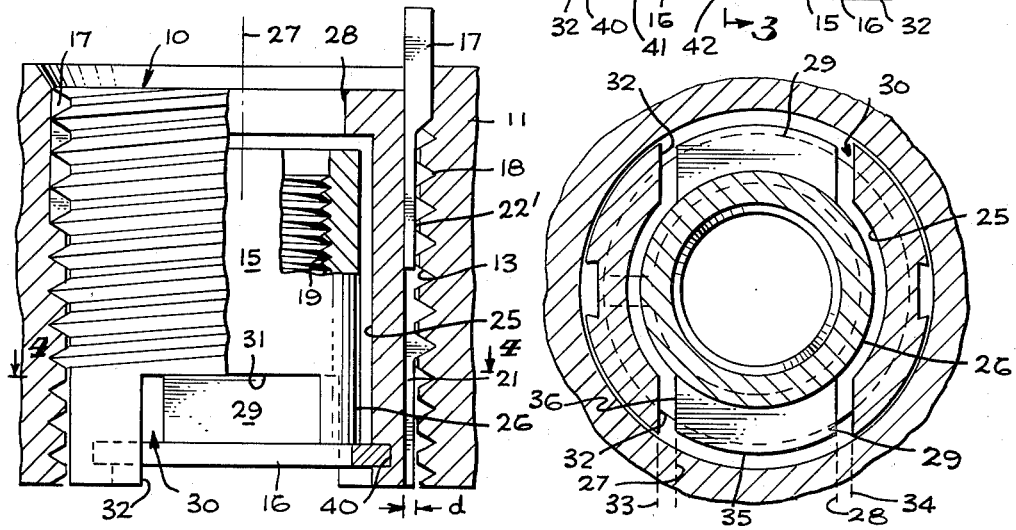
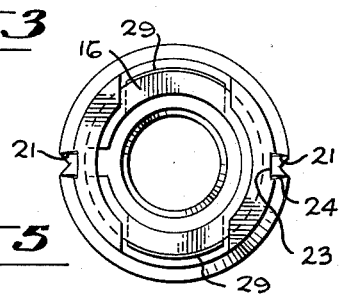
ROBERT NEUSCHOTZ
INVENTOR.
BY *William P. Green*
ATTORNEY

United States Patent Office 3,233,645
Patented Feb. 8, 1966

3,233,645
SELF-ALIGNING INSERTS
Robert Neuschotz, 1162 Angelo Drive,
Beverly Hills, Calif.
Original application Apr. 14, 1959, Ser. No. 806,339, now Patent No. 3,130,765, dated Apr. 28, 1964. Divided and this application Feb. 12, 1963, Ser. No. 257,911
3 Claims. (Cl. 151—23)

The present application is a division of my co-pending application Serial Number 806,339, filed April 14, 1959, now Patent No. 3,130,765, on "Self-Aligning Threaded Inserts."

This invention relates to improved threaded insert assemblies, of a type adapted to be mounted within a passage or bore in a main carrier part, and having internal threads into which an associated stud or bolt may be connected to attach the stud or bolt to the carrier part through the medium of the insert assembly.

In using threaded inserts of this general type, it is frequently very difficult to position the inserts so accurately within the carrier part as to assure completely precise alignment with an opening or passage in another part through which the stud or bolt is to pass. With this in mind, the general object of the present invention is to provide an improved insert assembly in which the stud engaging threads are formed in a part which is free for substantial lateral or transverse shifting movement, to thereby allow the threads to shift laterally into alignment with the coasting stud, even though the stud may not be aligned with the main axis of the overall insert assembly. In many instances in which it is not possible or practical to assure completely accurate alignment of a stud with the main axis of an insert structure, this self-aligning shifting movement of the present type of device has proven extremely helpful.

Structurally, an assembly constructed in accordance with the invention includes an outer essentially tubular section or shell, containing an inner internally threaded stud engaging section or part which is free for lateral shifting movement relative to the outer section. The outer tubular part is received directly within a passage or bore formed in the main carrier part, and engages that part within the passage in a relation holding the outer section in fixed position relative to the carrier part. For this purpose, the outer section has an external shoulder or shoulders which abut axially against the material of the carrier part in a manner transmitting axially outward load forces directly to that material. Preferably, this shoulder on the outer surface of the outer section takes the form of a screw thread, which extends helically along that outer surface and is adapted to be screwed into a similarly shaped thread formed within the interior of the passage in the carrier part. One or more locking keys may then be provided to lock the outer section against unscrewing rotary movement relative to the carrier part.

A particular object of the invention is to provide an arrangement of the discussed type in which axially outward load forces are transmitted from the inner nut section or nut element of the device to the outer section or body with maximum effectiveness and reliability, and in an overall assembly of minimum external dimensions. Further contemplated is an assembly having these advantages, and in addition one in which the inner and outer sections are so related as to be very easily assembled and retained together upon initial manufacture of the device.

To attain these results, I form the inner or nut section of the device to have a main essentially tubular portion carrying at its axially inner end at least one, and preferably two, ears or lugs projecting essentially radially outwardly into mating recesses formed at the axially inner end of the outer body section of the device. Such reception of a lug within a mating recess limits the shifting movement of the inner nut element relative to the outer body section. Also, the discussed lug or lugs desirably serve to transmit axially outward load forces from the inner nut element to the outer body, to thereby eliminate the necessity for the provision of a relatively heavy and strong load transmission shoulder at the outer end of the assembly.

Upon assembly of the inner nut element within the outer body section, the inner section may be easily inserted axially into the outer section, with the mentioned lug or lugs slipping axially into their mating recesses. The parts are then retained in this assembled position by means of a resilient snap ring, which is received within an internal groove formed in the outer body section at a location axially inwardly of the mentioned lug or lugs. This snap ring is resiliently constrictable to a reduced diameter condition to allow its initial installation within the groove, and is so positioned and dimensioned as to avoid interference with the desired limited shifting movement of the inner nut element relative to the outer body section.

The above and other features and objects of the invention will be better understood from the following detailed description of the typical embodiment illustrated in the accompanying drawing in which:

FIG. 1 is a perspective view showing an insert assembly constructed in accordance with the invention;

FIG. 2 is an enlarged section taken diametrically and axially through the FIG. 1 insert assembly;

FIG. 3 is a section taken primarily on line 3—3 of FIG. 2, but showing certain portions of the insert in elevation rather than section;

FIG. 4 is a transverse section taken on line 4—4 of FIG. 3; and

FIG. 5 is a bottom view of the insert assembly.

Referring first to FIG. 1, I have shown at 10 an insert assembly constructed in accordance with the invention, and adapted to be connected into a carrier part 11. This carrier part 11 may be typically formed of a metal such as aluminum, or a resinous plastic material, or any other material into which it may be desirable to connect a threaded insert. Part 11 contains a bore 12, whose inner wall is internally threaded at 13 so that the insert assembly 10 may be screwed into the bore.

FIG. 2 shows insert assembly 10 as it appears after being screwed into threaded bore 12 in part 11. Referring to FIG. 2, the assembly 10 includes an outer essentially tubular body section or element 14, an inner relatively movable essentially tubular section 15, and a snap ring 16 for securing parts 14 and 15 together. The assembly also includes two locking keys 17, which do not appear in FIG. 2, but do appear in FIGS. 1 and 3.

Outer section 14 has external threads 18 of a size and pitch corresponding to internal threads 13 in bore 12, so that the part 14 may be screwed into bore 12 to the fully installed position of FIG. 2. Inner nut element 15 contains internal threads 19 for receiving and threadedly engaging a threaded bolt 20 or other part with which assembly 10 is intended to coact.

The two keys 17 may be of the type disclosed and claimed in my Patent Number 2,885,970, issued October 14, 1958, on "Insert Having Frictionally Retained Key Which Upsets Threads of Base Member." These two keys are contained within two axially extending grooves 21 formed in the outer surface of part 14 at two diametrically opposite locations, which grooves extend into the material of part 14 to a depth which is a substantial distance $d$ (FIG. 3) radially inwardly beyond the minor diameter portions 22 of threads 13 and 18. Grooves 21 have the dove tail cross sectional configuration represented in FIGS. 4 and 5, so that the keys 17 are effectively confined within the grooves, and are guided thereby for only directly axial movement relative to part 14. Each key 17 has an axially inner portion 23 which is initially contained within groove 21, and an axially outer portion 24 projecting axially outwardly from and beyond the part 14. Portion 23 is sufficiently thin radially to be received entirely within the minor diameter 22 of teeth 13, so that this portion 23 does not interfere with the initial manual screwing of part 14 into bore 12. The outer portion 24 of the key is of an increased radial thickness, to project radially outwardy beyond the minor diameters 22 and 22' of teeth 13 and 18, so that when key 17 is driven axially from the position of the right hand key in FIG. 3 to the position of the left hand key, the portion 24 of the key acts to cut into and deform teeth 13 of part 11 in a manner positively locking part 14 against subsequent unscrewing rotary movement relative to part 11. Portions 23 of keys 17 are sufficiently tight fits within grooves 21 to frictionally hold the keys in the outwardly projecting positions of FIG. 1 relative to part 14 until the keys are forcibly driven to their locking positions. The cross sectional configuration of the keys corresponds generally to that of grooves 21, to guide the keys for their axial movement, and each of the outer portions 24 may form two parallel axially extending ridges, as seen in FIG. 5, to cut into the material of part 11.

Internally, part 14 has an inner cylindrical wall surface 25 defining the space within which inner nut element 15 is movably received. Along the major portion of the axial extent of nut element 15, this part is defined externally by an outer cylindrical surface 26, whose diameter is sufficiently smaller than the internal diameter of body wall surface 25 to allow part 15 to shift transversely of main axis 27 of the device, relative to part 14, through a very substantial range of movement. This shifting movement is of course designed to allow inner nut element 15 to shift laterally for self-aligning movement with respect to bolt or stud 20.

At its axially outer end, part 14 may have an inturned annular flange 28, having an opening large enough to pass screw 20 into threads 19 in any of the positions to which part 15 may be laterally shifted. This flange 28 may in some cases be an axial load bearing flange, but in certain applications is not load bearing, with the axially outward forces exerted against part 15 by bolt 20 then being taken by part 14 at its axially inner end. At that end, part 15 has at least one radially outwardly projecting transverse lug 29, preferably two such lugs at diametrically opposite sides of part 15. These lugs project radially outwardly beyond the diameter of outer surface 26 of the main tubular portion of part 15, and project into a pair of recesses 30 formed in the tubular side wall of part 14. Each of the recesses 30 is defined by three edge surfaces formed on part 14, and including a first surface 31 lying in a plane disposed transversely of axis 27, and two mutually parallel opposite edge surfaces 32 lying in parallel planes 33 and 34 (FIG. 4) extending parallel to axis 27. The surfaces 31 of the two recesses lie in a common plane, and corresponding edges 32 of the two recesses lie in common planes 33 and 34.

Lugs 29 on part 15 may be considered as defined by outer cylindrical surfaces 35 and opposite side surfaces 36 lying in parallel planes 27 and 28. Surfaces 36 of the lugs are spaced apart a distance shorter than the spacing between surfaces 32 of the recesses, so that the lugs are free for some limited rotary shifting movement within recesses 30. Also, the diameter of external surfaces 35 of the lugs is smaller than the minor diameter of external threads 18, so that the nut element 15 is free for substantial lateral shifting movement as desired.

Referring now to FIGS. 2 and 3, it is noted that the axially outer surfaces 39 of lugs 29 lie in a plane disposed transversely of axis 27, and are preferably engageable with surfaces 31 of the recesses, to transmit axially outward load forces to body part 14, with the axially outer end of element 15 being at all times spaced from flange 28 in the illustrated form of the invention.

Element 15 is retained within part 14 by means of the previously mentioned snap ring 16, which is received within an internal groove 40 formed in the inner surface of part 14, at a location axially inwardly of lugs 29. For engagement with ring 16, the axially inner end surface 41 of part 15 is disposed transversely of axis 27. Groove 40 is annular except insofar as it is interrupted at the locations of recesses 30. Snap ring 16 is circularly discontinuous at a point 42, so that the ring may be constricted to a reduced diameter condition for insertion axially into part 14 to the illustrated active position of the snap ring. In the FIG. 2 position of the ring, the resilience of the spring metal forming that ring urges it radially outwardly into tight engagement with part 14, to assure retention of the ring in its illustrated position.

In assembling the device illustrated in the figures, part 15 may be easily inserted into part 14 from the axially inner end of the latter (the lower end as viewed in FIGS. 1 and 2), with lugs 29 slipping into the axially inwardly opening recesses 30. After part 15 that thus been inserted into part 14, snap ring 16 may be constricted and slipped axially into part 14, to a position in which the snap ring may move outwardly into groove 40 to lock the parts in assembled condition. The device may then be used by screwing the assembly into a bore such as that shown at 12 in FIG. 1, and to the ultimate position illustrated in FIGS. 2 and 3. When the insert reaches this installed position, keys 17 are driven axially from the position of the right hand key in FIG. 3 to the position of the left hand key in that figure, to deform the material of outer carrier part 11 and thereby lock the insert in its fully installed condition. A stud or bolt such as that shown at 20 in FIG. 2 may then be screwed into the internal threads 19 within inner nut element 15, to secure the stud to part 11 through the medium of assembly 10. During connection of the stud into the nut element, part 15 is free to shift laterally relative to outer body 14 and through a substantial range of movement, to allow automatic self-alignment of element 15 within the stud. Regardless of what position element 15 may ultimately assume, however, lugs 29 effectively retain element 15 against rotary movement, and also desirably act to transmit axially outward load forces from element 15 to body 14 and carrier part 11.

What is claimed as new is:

1. A self-aligning insert comprising a hollow outer body having an essentially tubular side wall with external threads adapted to be screwed into a carrier part, said body containing a groove extending axially through said threads, a key mounted in said groove and drivable axially relative to the body for locking said body against unscrewing rotation from the carrier part, said side wall having an inner surface defining a passage through the body, a floating nut element having an essentially tubular portion which is received within said passage in the body and contains internal threads into which a coacting stud is threadedly connectible from a predetermined axially outer end thereof, said nut element being free for limited self-aligning shifting movement transversely of the axis of said internal threads and relative to said body, said tubular portion of the nut element having an outer surface received within said inner surface of the tubular body and smaller in cross section than said inner surface to allow said shifting movement of the nut element, said tubular side wall of the body containing at its axially inner end two essentially diametrically opposed recesses extending radially through said side wall and axially outwardly from said end into the material of said side wall and opening in an axially inward direction, said nut element having two essentially diametrically opposed radially projecting lugs at the axially inner end of said tubular portion and projecting radially outwardly farther than said tubular portion and into said recesses respectively, said lugs being smaller than and transversely shiftable within said recesses between a series of different positions, said body forming edges extending about and defining said recesses and including first edges disposed transversely of said axis and engageable by said lugs to transmit axially outward load forces from the lugs to the body, and additional axially extending edges engageable by the lugs to limit rotary shifting movement of the lugs relative to the body, said side wall of the body containing an internal groove axially inwardly of said lugs, and a resilient essentially flat snap ring received in said internal groove and projecting therefrom to a position in the path of axially inward removal of the nut element from said body to block said removal, said snap ring being resiliently constrictable to a reduced diameter for initial assembly of the insert, said snap ring having two portions bridging across said recesses and across said lugs at a location axially inwardly of the lugs and spaced from but essentially axially opposite said first edges of the recesses to lock the lugs in the recesses, both of said bridging portions being positioned in the path of axially inward withdrawal of the lugs from the body in all of said positions to which the lugs are shiftable, said body having a flange turned radially inwardly at a location axially outwardly beyond and opposite said nut element, said flange containing an opening larger than the major diameter of said internal threads but smaller than the external diameter of said nut element.

2. A self-aligning insert comprising a hollow outer body having an essentially tubular side wall with external threads adapted to be screwed into a carrier part, said body containing a groove extending axially through said threads, a key mounted in said groove and drivable axially relative to the body for locking said body against unscrewing rotation from the carrier part, said side wall having an inner surface defining a passage through the body, a floating nut element having an essentially tubular portion which is received within said passage in the body and contains internal threads into which a coacting stud is threadedly connectible from a predetermined axially outer end thereof, said nut element being free for limited self-aligning shifting movement transversely of the axis of said internal threads and relative to said body, said tubular portion of the nut element having an outer surface received within said inner surface of the tubular body and smaller in cross section than said inner surface to allow said shifting movement of the nut element, said tubular side wall of the body containing at its axially inner end two essentially diametrically opposed recesses extending radially through said side wall and axially outwardly from said end into the material of said side wall and opening in an axially inward direction, said nut element having two essentially diametrically opposed radially projecting lugs at the axially inner end of said tubular portion and projecting radially outwardly farther than said tubular portion and into said recesses respectively, said lugs being smaller than and transversely shiftable within said recesses between a series of different positions, said body forming edges extending about and defining said recesses and including first edges disposed essentially transversely of said axis and additional essentially axially extending edges engageable by the lugs to limit rotary shifting movement of the lugs relative to the body, said side wall of the body containing an internal groove axially inwardly of said lugs, and a resilient essentially flat snap ring received in said groove and projecting therefrom to a position in the path of axially inward removal of the nut element from said body to block said removal, said snap ring being resiliently constrictable to a reduced diameter for initial assembly of the insert, said snap ring having two portions bridging across said recesses and across said lugs at a location axially inwardly of the lugs and spaced from but essentially axially opposite said first edges of the recesses to lock the lugs in the recesses, both of said bridging portions being positioned in the path of axially inward withdrawal of the lugs from the body in all of said positions to which the lugs are shiftable, said body having a flange turned radially inwardly at a location axially outwardly beyond and opposite said nut element, said flange containing an opening larger than the major diameter of said internal threads but smaller than the external diameter of said nut element.

3. A self-aligning insert comprising a hollow outer body having an essentially tubular side wall with external threads adapted to be screwed into a carrier part, means for locking said body against unscrewing rotation from the carrier part, said side wall having an inner surface defining a passage through the body, a floating nut element having an essentially tubular portion which is received within said passage in the body and contains internal threads into which a coacting stud is threadedly connectible from a predetermined axially outer end thereof, said nut element being free for limited self-aligning shifting movement transversely of the axis of said internal threads and relative to said body, said tubular portion of the nut element having an outer surface received within said inner surface of the tubular body and smaller in cross section than said inner surface to allow said shifting movement of the nut element, said tubular side wall of the body containing at its axially inner end at least two circularly spaced notches extending into the material of said side wall in an axially outward direction from said inner end of the side wall and extending radially through the entire thickness of said side wall, said notches opening in an axially inward direction, said tubular side wall forming at least two circularly spaced first lugs projecting axially inwardly at locations circularly between said notches and defining said notches, said nut element having at least two circularly spaced radially projecting second lugs at the axially inner end of said tubular portion and projecting radially outwardly farther than said tubular portion and into said notches respectively, said second lugs being smaller than and transversely shiftable within said notches between a series of different positions, said body forming edges extending about and defining said notches and including first edges disposed essentially transversely of said axis at the axially outer side of said second lugs, and additional essentially axially extending edges engageable by the second lugs to limit rotary shifting movement thereof relative to the body, said first lugs containing essentially arcuate grooves at locations axially inwardly beyond said second lugs and which are essentially aligned circularly with one another but are interrupted at the locations of said notches, and a resilient essentially circular snap ring having first portions received in said grooves of the different first lugs respectively and having second portions which continue where said grooves are interrupted and which bridge across said notches and across the axially inner sides of said second lugs and are spaced from but essentially axially opposite said first edges of the notches to lock the second lugs in the notches, both of said bridging portions being positioned in the path of axially inward withdrawal of the second lugs from the body in different positions to which the second lugs are shiftable.

References Cited by the Examiner
UNITED STATES PATENTS

| | | | |
|---|---|---|---|
| 1,120,403 | 12/1914 | O'Leary | 151—41.73 |
| 2,491,306 | 12/1949 | Feitl | 85—8.8 |
| 2,553,236 | 5/1951 | Bratfisch | 85—70 |
| 2,634,934 | 4/1953 | Martin et al. | 151—41.73 |
| 2,855,970 | 10/1958 | Neuschotz | 151—41.73 |
| 2,972,367 | 2/1961 | Woolton | 151—41.7 |
| 2,986,188 | 5/1961 | Karp et al. | 151—41.73 |

FOREIGN PATENTS 558,379   1/1944   Great Britain.

EDWARD C. ALLEN, *Primary Examiner.*